Jan. 5, 1965   J. M. COOPER ETAL   3,164,338
ATMOSPHERE RE-ENTRY SYSTEM FOR SPACECRAFT
Filed June 29, 1959   2 Sheets-Sheet 1
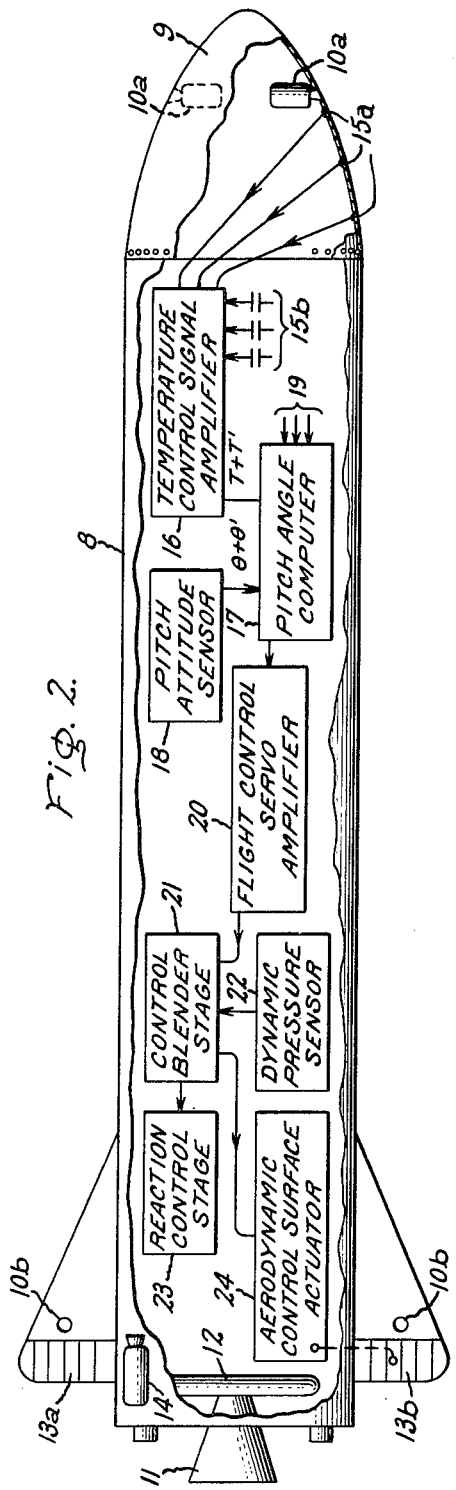
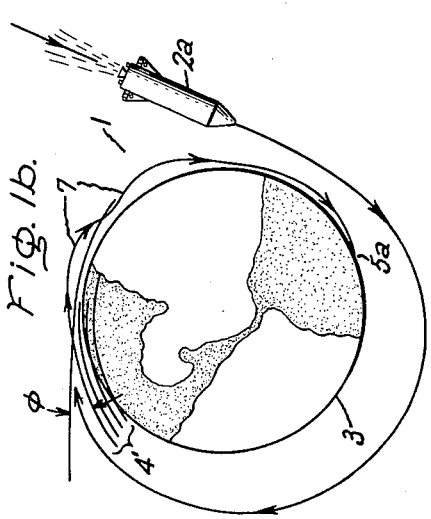
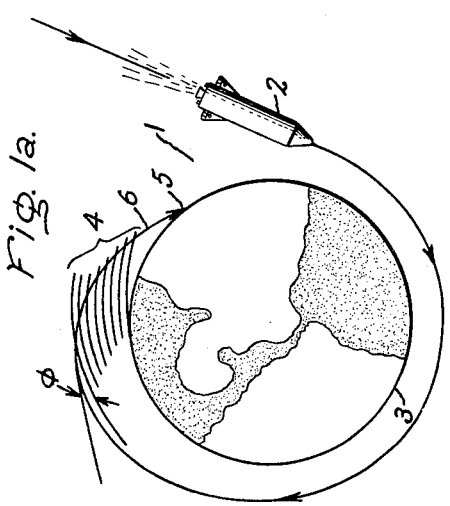
Inventors:
James M. Cooper,
Joseph D. Welch,
by Frank L. Doyle
Their Attorney.

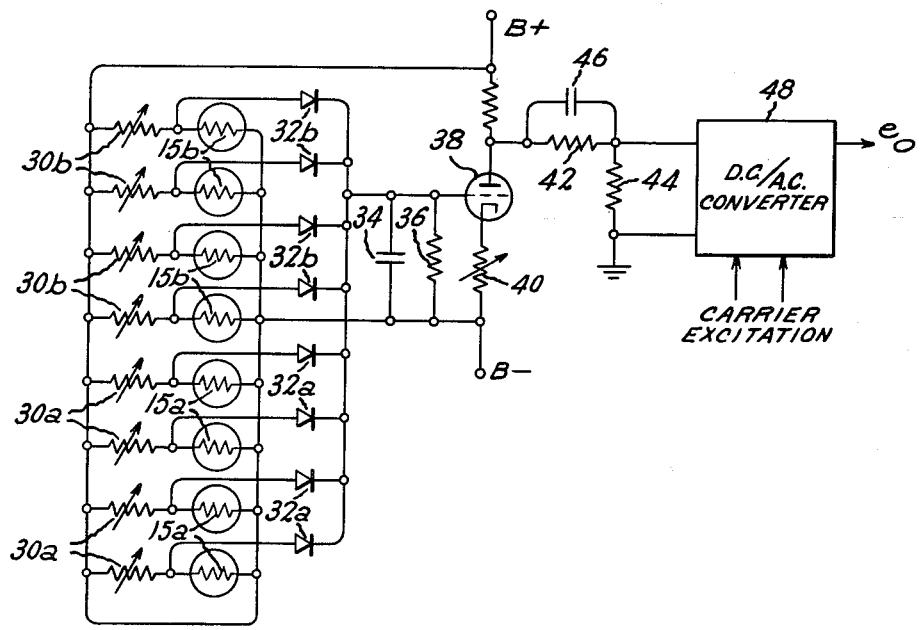

United States Patent Office 3,164,338
Patented Jan. 5, 1965

3,164,338
ATMOSPHERE RE-ENTRY SYSTEM FOR SPACECRAFT
James M. Cooper, Schenectady, and Joseph D. Welch, Troy, N.Y., assignors to General Electric Company, a corporation of New York
Filed June 29, 1959, Ser. No. 823,546
4 Claims. (Cl. 244—14)

This invention relates generally to extra-atmospheric vehicles, that is vehicles operating outside the atmosphere, and more particularly to a method and apparatus for controlling the path along which such devices re-enter and negotiate the atmosphere.

At the present stage of extra-atmospheric flight, one limiting factor is the temperatures which are encountered by a space craft seeking to negotiate the various strata which surround and envelop planets such as the earth. The velocity with which space exploration devices traverse the denser layers of air molecules and the like gives rise to what is known as the hypersonic heating phenomena, causing extremely high temperatures which represent a hazard to flight personnel within the space craft, as well as to the structural integrity of the materials and alloys employed in constructing the craft. The present invention contemplates a novel control apparatus by which re-entry of a space craft through such atmospheric strata, as well as travel within the atmosphere, may be negotiated without the hazard of destroying the space craft or the occupants thereof.

Accordingly, therefore, a primary object of the present invention is to provide a control system for controlling the attitude angle of a space craft thereby controlling its path angle, in accordance with the temperature of the craft.

Another object of the present invention is to provide circuitry and components for controlling a space craft during re-entry into the earth's atmosphere in such a way as to eliminate any risk of destruction due to hypersonic heating.

Another object of the present invention is to provide a system of utilizing temperature sensors as attitude control parameters for a space craft.

A further object of the present invention is to provide method and apparatus for utilizing temperature sensitive devices located at critical points in a space craft for the purpose of generating signals which are used to regulate the instantaneous pitch atttiude of the space craft to effect a safe re-entry and traversal of the atmospheric strata.

In carrying out this invention in one form a control system is provided for a space craft, or the like, the control system utilizing the outputs of temperature sensors, located at critical areas of the space craft, to control the attitude of the space craft in effecting a safe re-entry trajectory into the atmosphere.

The various objects and advantages of the present invention will become apparent by referring to the accompanying detailed description and drawings in which like numerals indicate like parts and in which:

FIGURE 1a illustrates pictorially the trajectory of a space craft in which the direction of flight is automatically adjusted in accordance with the present invention to provide a re-entry path according to a predetermined temperature profile;

FIGURE 1b shows pictorially the trajectory of a space craft which is caused to traverse a skip type re-entry pattern in penetrating the earth's atmosphere;

FIGURE 2 shows a fragmentary plan view of a space craft in which the inventive system is used for changing the attitude angle of the vehicle by deflecting the position of the aerodynamic control surfaces of the space craft, or through energizing manuevering rockets; and FIGURE 3 is an electrical schematic diagram of a temperature control amplifier which may be used with this invention.

Turning now to the detailed description of the invention and more particularly to FIGURE 1a, the reference numeral 1 has been used to designate generally the trajectory of a space craft attempting to re-enter and negotiate the earth's atmosphere. The space craft in this figure has been identified by the numeral 2 and may comprise any conventional vehicle such as a rocket, a missile, a reconnaissance satellite, or the like, which is capable of completing an extra-atmospheric journey.

The numeral 3 has been used, in FIGURE 1a, to identify the peripheral surface of the earth. Above the earth's peripheral surface, the atmosphere 4 is illustrated diagrammatically as comprising a layer of variable density which extends outwardly for a great distance, for example, terrestrial space is generally considered to be a region extending from 200 to 3500 miles above the earth. It will be appreciated that the atmosphere 4 includes layers of relatively more dense strata in proximity to the earth and layers of relatively less dense strata at distances comparatively remote therefrom.

The space craft 2 enters the atmosphere 4 at an initial angle of re-entry $\phi$. By means of the present invention, the space craft attitude angle is continuously controlled in order to provide for the termination of the flight of the space craft 2 at an ultimate landing site 5. The specific trajectory described by the space craft is arriving at the site 5 is identified by the reference numeral 6 and takes the form of a predetermined temperature profile re-entry path in which the attitude of the space craft is regulated in accordance with the temperature conditions encountered at the nose cone or other critical portion of the space craft. It will be appreciated that an important concept in the practice of the invention resides in the provision for using temperature sensors as attitude control parameters which modulate the instantaneous attitude angle of the space craft in order to provide a controlled temperature profile re-entry. This instantaneous attitude angle modulation is achieved by comparing the temperature sensor signal with the pitch attitude sensor signal in the pitch angle computer. If the temperature exceeds a given temperature, as determined from the temperature profile, the pitch angle control signal from the computer will have a polarity such as to cause the attitude of the spacecraft to be altered in a direction to decrease the rate of re-entry. The amount of change in the attitude will depend on the magnitude of the difference between the desired and actual temperature signals. A large difference, occurring as a consequence of an excessive temperature and resulting in a large magnitude control signal, will cause the spacecraft to move up into a less dense region to cool off before continuing along a decreased rate of re-entry path. Conversely, if the temperature is below a temperature determined from the temperature profile, the polarity of the computer control signal will be such as to cause the attitude of the craft to be altered in a direction to increase the rate of re-entry. In this manner, the instantaneous attitude is constantly controlled in order to have the spacecraft re-enter the atmosphere along the predetermined temperatures profile.

In FIGURE 1b of the accompanying drawings, the use of the inventive system in providing a skip type re-entry pattern is illustrated. In this drawing, a space craft 2a is caused to orbit the earth's surface 3 and enter the atmosphere 4 at an initial angle of re-entry $\phi$. The trajectory of the space craft 2a from the instant of experiencing the initial angle of re-entry will be seen to form a skip type pattern 7 in which the craft successively enters and leaves the atmosphere 4 until the altitude and forward velocity of the space craft is attenuated to the point which permits termination of the flight at an ultimate landing site 5a.

It will be appreciated that the skip type pattern 7 shown in FIGURE 1b is accomplished in accordance with signals which are produced by temperature sensors and utilized to vary the instantaneous attitude angle of the space craft 2a. This is accomplished by an airborne computer which varies the attitude angle of the space craft causing it to rise outside of the atmosphere for the purpose of radiating heat occasioned by hypersonic heating. The steady state forward velocity of the space craft is gradually diminished during these successive excursions into and out of the denser layers of the atmosphere in order to permit a successful controlled landing. The temperature and attitude signals are compared and utilized as disucssed in connection with FIGURE 1a, except that instead of varying the attitude to follow a temperature profile the spacecraft attitude is changed by large increments so that the spacecraft actually moves out of the atmosphere when a predetermined high temperature is reached. After cooling has occurred to a predetermined temperature by heat radiation outside of the atmosphere, the attitude is again changed to bring the spacecraft back into the denser atmosphere. This skip-pattern continues until the velocity is decreased to a point that re-entry may be achieved without exceeding the predetermined temperature.

Turning now to FIGURE 2 of the drawings, the numeral 8 has been used to identify diagrammatically a space craft or like vehicle. The craft 8 may comprise a conventional rocket, such as a missile or the like, which is capable of ranging far from the earth's surface and effecting a controlled return flight thereto. In order to avoid unnecessarily complicating the drawing, only the flight control system of the present invention has been shown in FIGURE 2 and no detailed illustration of the fuel tanks, valving or associated accessories has been provided.

The space craft 8 is provided with a nose cone 9 formed of suitable commercially available thermal absorption material, such as metal ceramic or the like. The craft is also provided with reaction control rockets 10 for adjusting the attitude of the craft. The reaction control rockets 10a may be utilized to control the pitch attitude of the craft 8, while rockets 10b may be utilized to control the roll attitude of the craft. It will be understood that other reaction control rockets may also be provided for controlling the yaw attitude of the space craft. While this application is written as utilizing pitch attitude control, it will be understood that similar results may be obtained by controlling yaw attitude of the space craft.

In the extreme left-hand portion of FIGURE 2, the numeral 11 has been used to designate a nozzle which is capable of exhausting a column of burning fuel or the like for providing thrust to the space craft. The nozzle 11 may be mounted within craft 8 on a nozzle support 12 to provide the desired thrust vector along the axial center line of the craft. In order to provide directional control within certain denser portions of the atmosphere, where reaction control would not be as effective, the space craft is equipped with aerodynamic control surfaces 13a and 13b. These control surfaces are used for regulating the attitude of the space craft in portions of the atmosphere which are characterized by a value of air density which permits effective utiliaztion of such control surfaces.

The space craft 8 may also be equipped with retro-rockets 14 which may be used to provide reverse thrust for the purpose of decelerating the space craft upon return to the earth's atmosphere, and partially dissipating the velocity thereof prior to re-entry.

In FIGURE 2 the reference numeral 15a has been used to identify a plurality of temperature sensors which are positioned in the nose cone 9 of the space craft for the purpose of sampling the nose cone temperature. The reference character 15b has been used to designate diagrammatically a different set of conductors in order to illustrate the possibility of positioning temperature sensors at other equally strategic points such as the cabin of the space craft. The sensors thus employed may be of any desired type. For example, they may be conventional elements such as thermocouples, which produce an electrical signal having a magnitude which is a function of the sampled temperature. Resistive elements which produce a change in resistance proportional to temperature, may also be used.

The output of the temperature sensors 15a is fed in parallel to a temperature control signal amplifier 16. The amplifier 16 is capable of producing an electrical output voltage which reflects both the magnitude and the rate of change of the most critical temperature. The amplifier 16 is provided with conventional scaling circuitry therein for the purpose of properly proportioning or weighing the electrical signals received from the temperature sensors 15a. The amplifier contains means for applying a scaling factor to these signals because of the fact that a relatively cooler temperature in one portion of the space craft may indicate a condition which is more dangerous than that indicated by a higher temperature in a different zone.

This means that the particular electrical signal which indicates such as dangerous temperature must be scaled up in magnitude in order to provide an output signal capable of recognition by the successive stages of circuitry in the system. This is necessary because the existence of a dangerous condition is recognized by the subsequent stages of circuitry by its capacity to distinguish higher magnitudes of potential.

An example of a temperature control amplifier which may be used in this invention is shown in FIGURE 3. A number of temperature sensors 15a, 15b are provide, each being connected in series with a scale factor control device 30a, 30b. The various scale factor controls 30a, 30b are preset in accordance with the location of their respective temperature sensors 15a, 15b. The temperature sensors 15a, 15b may be resistive elements, such as tungsten filaments, and are placed in a voltage divider circuit, as shown, to provide a voltage output as a function of temperature. Each temperature sensor is provided with an unidirectional conducting device 32a, 32b, such as diodes, to prevent the temperature sensing circuits from loading each other. A peak storing capacitor 34 is provided, having a discharge path through resistor 36. The resistor 36 also forms the grid leak for the amplifier tube 38, the tube 38 being provided with a variable cathode resistor 40, for setting the bias level of tube 38. A rate circuit, comprising resistors 42, 44 and capacitor 46 is provided for obtaining the derivative of the voltage signal. A D.C. to A.C. converter 48, converts the temperature signal and the temperature rate signal, providing the desired temperature control signal as the output.

The output potential from the temperature control signal amplifier 16 comprises a voltage which reflects both the magnitude and the derivative of the most critical temperature signal. A peak reading technique is employed within amplifier 16 to recognize the highest and most critical temperature as well as the rate of change of this signal, and a signal proportional to both values is applied to the input terminals of a computer, which may be, for example, a pitch angle computer 17. The angle computer 17 is also connected to receive a signal from an attitude sensor, such as pitch attitude sensor 18, which derives an output potential jointly related to the pitch angle and the rate of change of the pitch angle.

The pitch angle computer 17 accepts input potentials from the attitude sensor 18 as well as the signal amplifier 16 and generates pitch attitude control signals with definite characteristics. More particularly, the polarity and amplitude of this control signal must be such as to change the pitch attitude of the vehicle by an amount which depends upon the magnitude of the temperature change. The greater this change, the greater must be the change in the attitude to compensate for the temperature deviation. This change in attitude must be sufficient to point the craft into oncoming layers of atmospheric strata which are relatively more or less dense, according to the polarity of the temperature signal. By this means, a temperature controlled re-entry path, such as is shown by the reference numeral 6 in FIGURE 1a, may be traversed by the space craft.

The type of temperature controlled path described by the space craft in FIGURE 1a may be effected by output signals which are generated by the pitch angle computer 17 in response to a prior programming operation. This means that the pitch angle computer 17 may be programmed in advance from known data to compute and correlate the polarity and magnitude of the output signal with the characteristics of the input signals received from the amplifier 16 and the pitch attitude sensor 18. The output signal will, therefore, accurately reflect the change in temperature sensed and attitude changes necessitated by temperature variations may be accurately controlled.

Although the basic embodiment of the invention is operative with the input signals to the computer explained above, it is possible to exploit a more sophisticated computing sequence, as will be appreciated by those skilled in the art. The reference numeral 19 has been used in FIGURE 2 to take account of this fact by indicating a plurality of conductors which may be connected to provide data on other modifying parameters to the computer 17. For instance, input data on variables such as altitude, velocity, acceleration, or the like, may be applied to the input stages of the computer 17 for use in determining the pitch angle necessary to permit the vehicle to exploit the maximum safe re-entry rate through the earth's atmosphere. When these additional parameters are considered in the program above it is possible to achieve accurate control of the spacecraft attitude within even closer limits than that achieved in the basic system.

Continuing with the detailed description of the invention, the numeral 20 has been used in FIGURE 2 to identify a flight control servo-amplifier. This servo-amplifier is connected to receive and increase the magnitude of the output potentials produced by the computer 17. The increased output signals from the servo-amplifier 20 are applied to a control blender stage 21. The blender stage 21 may be connected to receive energizing signals from a dynamic pressure sensor 22, if desired. The sensor 22 detects the dynamic air pressure, providing an indication of sufficiently dense air to permit directional flight control of the craft in response to movements by the aerodynamic control surfaces 13a and 13b. The dynamic pressure sensor signal supplied to the control blender stage is essentially an indication of the density of the atmosphere in which the spacecraft is located. When the spacecraft is in sufficiently dense air, the aerodynamic control surfaces will be able to provide the desired attitude changes. When this density of air is reached, the signal from the dynamic pressure sensor causes the control blender stage to activate the aerodynamic control surface actuators.

Directly above the control blender stage 21 there is illustrated a reaction control stage 23. The stage 23 is connected to receive energizing potential from the blender stage 21. Control stage 23 provides a control signal to the various reaction rockets 10, selectively operating them as required to provide the desired craft attitude. This has been indicated diagrammatically in FIGURE 2 by the lines between the control stage 23 and the reaction rockets 10. The numeral 24 has been used in this figure to identify an aerodynamic control surface actuator which is ganged or otherwise linked to the control surfaces 13a and 13b to deflect them in accordance with signals transmitted from the blender stage 21 illustrated directly above.

It will now be appreciated that the control blender stage has the function of selectively combining the control which is effected by selectively operating the various reaction rockets with the measure of control which may be effected by deflecting the control surfaces 13a and 13b. Thus, where the dynamic pressure is negligible, the influence exerted on the control surfaces by the actuator 24 is negligible. On the other hand, in the denser layers of strata, the pressure sensor 22 transmits a regulating signal to the control blender stage 21 and causes it to energize the aerodynamic control surface actuator 24 and regulate the space craft attitude by moving the control surfaces. The attitude of the craft may be changed by selectively energizing the desired reaction rockets simultaneously with this movement of the aerodynamic control surfaces of the space craft.

In practice, the operation of the inventive system is as follows. The velocity of the vehicle prior to re-entry into the earth's atmosphere may be diminished by means such as the retro-rockets 14 or the like. It is then necessary for the space craft to assume an initial re-entry angle $\phi$, determined by the craft attitude, which will avoid any degree of hypersonic heating capable of destroying the space craft. For a space craft returning from a journey through extra-atmospheric regions, such as from the moon, it is of course necessary to exploit precise navigation methods and to fire the retro-rockets for a controlled interval in order to adjust the velocity vector to permit the initial re-entry phase. The maximum initial re-entry angle $\phi$ depends upon the entering velocity and the heat absorption characteristics of the returning space craft. For any given type of space craft, it will be appreciated that the maximum initial re-entry angle varies as a function of velocity. If the space craft exceeds this angle for any appreciable time interval, the risk of being destroyed by the excessive heat resulting from hypersonic heating becomes great.

In practicing the present invention, the first phase in executing the re-entry trajectory is the ascertainment of the magnitude and direction of the velocity vector. Then, reaction control is applied, as necessary, to cause the space craft to enter the atmosphere at an angle consistent with the predetermined temperature profile. As mentioned in the present specification, this may be accomplished by the use of controls which vary the direction of reaction, and by firing the retro-rockets for a precisely calculated interval. By this means, the required reduction in the magnitude and angle of the velocity vector is effected.

As the space craft then begins to fall out of orbit, reaction control is provided, placing the space craft in the desired attitude. The attitude of the vehicle is regulated in this manner to allow entry into the atmosphere at the proper attack angle.

As the re-entry phase continues, a signal which reflects the critical temperature and the rate of rise of this temperature as sampled at the instrumented areas is acted upon within the temperature control signal amplifier 16. The critical signal, as rendered so recognizable by proper scaling, is then fed into the pitch angle computer 17 along with pitch attitude position and rate data. The pitch angle computer 17 utilizes these inputs to generate control signals which are applied to the flight control servo-amplifier 20. The subsequent stages of circuitry regulate the pitch attitude of the space craft 8 according to the commands which are provided by the pitch angle computer. As a result, the space craft is caused to approach the preselected temperature profile path 6. As the sampled temperature departs from this profile, the pitch angle computer 17 changes the attitude angle in order to maintain the desired temperature profile. For example, should the temperature rise above the predetermined profile, the computer causes the space craft to seek and traverse a less dense atmospheric strata.

As re-entry process proceeds, the velocity of the space craft diminishes and the dive angle gradually increases in order to maintain the programmed temperature. At some predetermined dive angle, the temperature control signal is amplitude limited by the amplifier 16.

At this point, conventional attitude control reference signals, provided by the pitch attitude sensor, take over automatically and the space craft is guided to the ultimate landing site 5 by means of this control system. Switching to the conventional attitude control system may be achieved in any of a number of ways, such as by determining the air density, by measuring the spacecraft altitude or by ascertaining when the temperature control signal is amplitude limited. When these indicators provide information that the desired position has been reached, a conventional switching arrangement would transfer control to the conventional attitude control systems. It will of course be appreciated in this connection that, in the case of a manned vehicle, the output of the pitch angle computer can be exhibited on a pilot's display console in order to allow a pilot to perform the re-entry process manually.

It should also be recognized, as explained in connection with FIGURE 1b, that the pitch angle computer may change the attitude of the craft in order to propel the space craft through a series of shallow dives into and through the atmosphere. After each such dive, as the temperature rises, the computer routes the space craft to a more remote atmospheric zone where the accumulated heat can be rapidly radiated. In this way, the velocity of the space craft is attenuated through each successive phase of the skip-pattern until it has slowed enough to permit a safe termination of the space journey at the ultimate landing site 5a.

It should be appreciated that the invention is not limited to the concept of adjusting the craft attitude by reaction control and/or the control surfaces. More particularly, provision for variable operation of drag producing devices, such as parachutes, as a function of a critical temperature value sampled by the temperature sensors would be deemed to fall within the scope of the invention. For instance, temperature detection at a critical zone of the space craft can be used equally well to initiate the opening of conventional drag means, such as parachutes or the like. With this aspect of the invention, the amount of drag exerted by the drag device is modulated in accordance with signals produced by the computer. Thus, the output signals from the pitch angle computer 17 may be used to control the opening in a parachute during the re-entry process through the atmospheric strata. Then, sensors positioned on the drag device may be used to feed the computer in order to provide deceleration velocities which do not jeopardize the structural integrity of the particular drag device during re-entry.

Although the present invention has been shown and described in terms of preferred embodiments, many of the changes, modifications and alterations thereto will be deemed to fall within the purview of the invention.

What is claimed as new and which is desired to secure by Letters Patents of the United States is:

1. A system for controlling the re-entry trajectory of a space craft which traverses atmospheric strata of varying density which includes sensor means mounted to detect temperature changes occasioned in a portion of said craft by passage through said atmospheric strata and produce electrical signals responsive thereto, amplifier means connected to receive and scale said electrical signals received from said sensor means, pitch attitude sensor means mounted within said craft to produce a voltage which reflects the instantaneous pitch angle thereof, pitch angle computer means connected to sample the ouput signal from said amplifier means and the voltage from said pitch attitude sensor means and produce an output potential jointly responsive thereto, and means connected responsive to said output potential from said computer means to regulate the trajectory of said space craft during re-entry to reflect said temperature changes occurring in said portion of said space craft.

2. A system for controlling the re-entry trajectory of a space craft which traverses atmospheric strata of varying density which includes sensor means mounted to detect temperature changes occasioned in a portion of said craft by passage through said atmospheric strata and produce electrical signals responsive thereto, amplifier means connected to receive and scale electrical signals received from said sensor means, attitude sensor means mounted within said craft to produce a voltage which reflects the instantaneous attitude thereof, attitude angle computer means connected to sample the output signal from said amplifier means and the voltage from said attitude sensor means and produce an output potential jointly responsive thereto, and means including a reaction control stage and an aerodynamic control surface actuator connected to regulate the re-entry trajectory of said space craft responsive to the amplitude and polarity of said output potential produced by said computer means.

3. A system for controlling the re-entry trajectory of a space craft which traverses atmospheric strata of varying density which includes sensor means mounted to detect temperature changes occasioned in a portion of said craft by passage through said atmospheric strata and produce electrical signals responsive thereto, amplifier means connected to receive and scale said electrical signals received from said sensor means, pitch attitude sensor means mounted within said craft to produce a voltage which reflects the instantaneous pitch angle thereof, pitch angle computer means connected to sample the output signal from said amplifier means and the voltage from said pitch attitude sensor means and produce an output potential jointly responsive thereto, flight control servo-amplifier means connected to receive and amplify said output potential produced by said computer means, and means connected responsive to the output signal from said servo-amplifier means to regulate the trajectory of said space craft during re-entry in accordance with said temperature changes occurring in said portion of said space craft.

4. A system for controlling the re-entry trajectory of a space craft which traverses atmospheric strata of varying density which includes sensor means mounted to detect temperature changes occasioned in a portion of said craft by passage through said atmospheric strata and produce electrical signals responsive thereto, amplifier means connected to receive and scale said electrical signals received from said sensor means, pitch attitude sensor means mounted within said craft to produce a voltage which reflects the instantaneous pitch angle thereof, pitch angle computer means connected to sample the output signal from said amplifier means and the voltage from said pitch attitude sensor means and produce an output potential jointly responsive thereto, flight control servo-amplifier means connected to receive and amplify said output potential produced by said computer means, a pressure sensor means mounted within said space craft to detect the presence of atmospheric strata of sufficient density to permit control of said craft by aerodynamic control surfaces, reaction control means mounted to supply reaction force to said space craft, control surface means mounted externally of said space craft to regulate the pitch attitude thereof, and means including a control blender stage connected responsive to said pressure sensor means and said servo-amplifier means to selectively actuate said reaction control means as well as said control surface means in predetermined ratio to regulate the re-entry trajectory of said space craft.

References Cited by the Examiner

Rockets, Missiles and Space Travel: W. Ley, 1957; Viking Press, N.Y.; page 397.

SAMUEL FEINBERG, *Primary Examiner.*